(12) United States Patent
Rosewarne et al.

(10) Patent No.: US 9,749,626 B2
(45) Date of Patent: Aug. 29, 2017

(54) MODULO EMBEDDING OF VIDEO PARAMETERS

(75) Inventors: Christopher James Rosewarne, Gosford (AU); Rowena Wilson, Coopers Plains (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 958 days.

(21) Appl. No.: 14/006,645

(22) PCT Filed: Mar. 16, 2012

(86) PCT No.: PCT/AU2012/000279
§ 371 (c)(1),
(2), (4) Date: Nov. 13, 2013

(87) PCT Pub. No.: WO2012/126045
PCT Pub. Date: Sep. 27, 2012

(65) Prior Publication Data
US 2014/0056366 A1  Feb. 27, 2014

(30) Foreign Application Priority Data
Mar. 23, 2011 (AU) ................................. 2011201336

(51) Int. Cl.
*H04N 19/85* (2014.01)
*H04N 5/00* (2011.01)
(Continued)

(52) U.S. Cl.
CPC ......... *H04N 19/00903* (2013.01); *H04N 5/00* (2013.01); *H04N 7/00* (2013.01);
(Continued)

(58) Field of Classification Search
CPC ....................... H04N 19/103; H04N 19/00903
See application file for complete search history.

(56) References Cited

U.S. PATENT DOCUMENTS

| 7,293,180 B2 | 11/2007 | Ueda et al. | |
|---|---|---|---|
| 2005/0111381 A1* | 5/2005 | Mukherjee | H04L 29/06027 370/254 |
| 2006/0204115 A1* | 9/2006 | Burazerovic | H04N 19/115 382/239 |

OTHER PUBLICATIONS

Thiesse et al.; "Data hiding of intra prediction information in chroma samples for video compression"; Proceedings of 2010 IEEE 17th International Conference on Image Processing, Sep. 2010, p. 2861-2864.

(Continued)

*Primary Examiner* — William C Vaughn, Jr.
*Assistant Examiner* — Jerry Jean Baptiste
(74) *Attorney, Agent, or Firm* — Canon U.S.A., Inc. IP Division

(57) ABSTRACT

A decoding method of selecting a value for a video parameter based on a portion of video data encoded in a video bitstream. The method receives the portion of encoded video data from the video bitstream and determines an aggregate value based on the received portion of the video data. The method determines a remainder by dividing the aggregate value with a predetermined value and then selects a value for the video parameter from a set of predefined values according to a mapping from the determined remainder, wherein the mapping has at least a plurality of values for a remainder corresponding to a single value for the video parameter. Associated methods for encoding are also disclosed.

23 Claims, 13 Drawing Sheets

(51) Int. Cl.
*H04N 7/00* (2011.01)
*H04N 19/50* (2014.01)
*H04N 19/103* (2014.01)
*H04N 19/463* (2014.01)
H04N 19/503 (2014.01)
H04N 19/86 (2014.01)

(52) U.S. Cl.
CPC ......... *H04N 19/103* (2014.11); *H04N 19/463* (2014.11); *H04N 19/50* (2014.11); *H04N 19/85* (2014.11); *H04N 19/503* (2014.11); *H04N 19/86* (2014.11)

(56) References Cited

OTHER PUBLICATIONS

Thiesse et al.;"Data hiding of motion information in chroma and luma samples for video compression", Oct. 2010.

* cited by examiner

| MVComp Flag (901) | Mod8 Result (902) | Min. Mapping Distance (903) |
|---|---|---|
| 0 | 0 | 1 |
| 0 | 1 | 2 |
| 0 | 2 | 1 |
| 1 | 3 | 1 |
| 1 | 4 | 2 |
| 1 | 5 | 3 |
| 1 | 6 | 2 |
| 1 | 7 | 1 |

Fig. 9

| MVComp Flag (1001) | Mod8 Result (1002) | Min. Mapping Distance (1003) |
|---|---|---|
| 0 | 0 | 1 |
| 1 | 1 | 1 |
| 1 | 2 | 1 |
| 0 | 3 | 1 |
| 1 | 4 | 1 |
| 1 | 5 | 1 |
| 0 | 6 | 1 |
| 1 | 7 | 1 |

Fig. 10

MODULO EMBEDDING OF VIDEO PARAMETERS

REFERENCE TO RELATED PATENT APPLICATION

This application claims the benefit of priority under the International (Paris) Covention and under 35 U.S.C. §119 of the filing date of Australian Patent Application No. 2011201336, filed Mar. 23, 2011, hereby incorporated by reference in its entirety as if fully set forth herein.

TECHNICAL FIELD

The present invention relates to digital video signal processing and, more specifically, to a system and method for video coding having improved coding efficiency.

BACKGROUND

The field of digital data compression and in particular digital video compression has attracted great interest for some time. In digital video compression, many techniques have been proposed and utilised to compress video information. Particular emphasis has been placed on techniques that provide an attractive balance between high compression and low distortion of the video information.

Compression of a video sequence, by a typical video encoder, generally involves the derivation of a set of syntax elements that describe the video sequence, and consequential entropy encoding of those syntax elements into an encoded bitstream. The set of syntax elements typically comprises flags, numeric values, such as residual coefficients, and a variety of other parameters. Entropy encoding methods can be tailored to suit each type of syntax element to result in a more efficiently encoded video sequence.

A known method of entropy encoding a binary flag exists whereby the flag is encoded into a video bitstream by embedding the value of the flag into a set of the residual coefficients with a frame of a video sequence. In this method, the video encoder indicates the value of the binary flag to the video decoder through the parity bit of the sum of the residual coefficients. This method of encoding a binary flag has advantages over the more basic method of adding the flag information as a new syntax element in the bitstream. The embedding method does not explicitly increase the size of the bitstream through the addition of a new syntax element.

If the natural parity of the sum of the residual coefficients correctly indicates the value of the binary flag to be encoded, the above method will not increase the size of the bitstream, or cause a distortion of the encoded video sequence. However, if the natural parity of the sum of the residual coefficients is inverse to the value of the binary flag, then there is a need to manipulate one or more of the residual coefficients such that the manipulated parity matches the value of the binary flag to be encoded.

The embedding of the binary flag occurs just prior to the encoding of the residual coefficients into the bitstream. In a typical video encoder pipeline, the entropy encoding of residual coefficients occurs after the optimal value of the residual coefficients has been determined, so as to optimise the rate/distortion function. The values of the residual coefficients are quantised such that their values represent an optimal balance between bitstream size and the quality of the encoded video sequence, as measured by peak signal to noise ratio.

Any manipulation of the residual coefficient values will degrade the values away from the optimal rate/distortion balance. This degradation could present itself as an increase in the bitstream size for the encoded video sequence, or a decrease in the quality of the encoded video sequence, as measured by peak signal to noise ratio. Either outcome is undesirable.

Irrespective of the expected distribution of the two possible values of the binary flag to be encoded, the parity bit of the sum of the residual coefficients will need to be manipulated away from its natural state in fifty percent of instances.

It is therefore desirable to minimise the number of instances in which the syntax elements are manipulated and the extent to which they are manipulated in order to embed the video parameter in the video data. A reduction the number of manipulations is desired to minimise the degradation of the optimum rate distortion.

SUMMARY

According to one aspect of the present disclosure, there is provided a method of selecting a value for a video parameter based on a portion of video data encoded in a video bitstream, the method comprising:

receiving the portion of encoded video data from the video bitstream;

determining an aggregate value based on the received portion of the video data;

determining a remainder by dividing the aggregate value with a predetermined value;

selecting a value for the video parameter from a set of predefined values according to a mapping from the determined remainder, wherein the mapping has at least a plurality of values for a remainder corresponding to a single value for the video parameter.

Desirably the video parameter relates to the video data in which the video parameter is encoded. Also the mapping may be configured to reduce at least one of a manipulation frequency and a manipulation cost associated with the selecting. Preferably the number of remainder values in the plurality of values for a remainder, that are mapped to a single value for the video parameter, is selected to reflect a frequency of occurrence of the value for the video parameter. The frequency of occurrence may be calculated based on content of the video bitstream received before the portion of video data. The frequency of occurrence can alternatively be a predetermined characteristic of the video parameter.

The method may further determine the mapping by evaluating a minimal mapping distance between the plurality of values for a remainder and selecting one of the plurality having the largest minimum mapping distance to determine the selected value for the video parameter. Desirably the mapping is determined such that alternate video parameter values are interleaved throughout the range of remainder values.

Dynamic mapping may be used where the mapping is a first mapping, the method further comprising: monitoring a frequency of occurrence of the video parameter values, detecting a frequency of occurrence matching a predetermined threshold, creating a second mapping configured according to a second frequency of occurrence, and changing the selecting from the first mapping to the second mapping. The creating of the second mapping may alter the mapping from the remainder values to the video parameter values. Preferably the values that form the plurality of values for a remainder are selected to reduce a manipulation cost of the selecting. Creating of the second mapping may comprises altering the predetermined value and consequentially changing the mapping. The method may further select selecting a mapping path from the determined remainder to a value for the video parameter according to a frequency of occurrence of the value for the video parameter.

Desirably the video parameter has a limited number of values selected from one of binary and ternary values.

The method may be adapted to select a most probable prediction mode (MPM) to be applied to a prediction unit in an encoded video stream based on residual coefficients encoded in a video bitstream, by:

receiving a portion of the residual coefficients from the video bitstream;

deriving a value from the portion of the residual coefficients;

determining a remainder from the portion of the residual coefficients according to a modulo function applied to the derived value;

selecting the most probable prediction mode from a set of predefined most probable prediction modes according to a mapping from the determined remainder, wherein the mapping has at least a plurality of values for a remainder corresponding to a single value for the most probable prediction mode, said correspondence being determined from a frequency of occurrence of said most probable prediction mode.

Also disclosed is a method of encoding a video parameter, pertaining to a portion of video data, in a video bitstream, the video parameter having a desired value of n possible values, the method comprising the steps of:

calculating a remainder from the portion of video data, the remainder be one of m possible remainders, m being greater than n;

selecting a mapping path from a predetermined mapping from the calculated remainder to one of the n possible video parameters;

determining whether the one video parameter is the desired value; and encoding the portion of video data where the one video parameter is the desired value.

Desirably the adjusting of the portion of the video data is comprises minimizing a manipulation cost associated with the adjusting.

Also disclosed is a method of encoding a video parameter, pertaining to a portion of video data, in a video bitstream, the video parameter having a desired value of n possible values, the method comprising the steps of:

calculating a remainder from the portion of video data, the remainder being one of m possible remainders, m being greater than n; selecting a mapping path from a predetermined mapping from the calculated remainder to one of the n possible video parameters;

determining whether the one video parameter is not the desired value;

adjusting, where the one video parameter is not the desired value, the portion of video data to modify the remainder such that modified remainder maps to the desired value of the video parameter; and encoding the adjusted portion of the video data.

This approach may further selecting a desired remainder from the plurality of m possible remainders to minimize the manipulation cost.

In these encoding methods, the calculating may evaluate a number representative of the set of video data, and applying a modulo function to the evaluated number to determine the remainder such that m is the base of the modulo function. Preferably m is at least 3 and n is at least 2 and the mapping maps the m possible remainders to the n possible values according to a probability distribution associated with the video parameter. Also the mapping maps each of a plurality of the possible remainders to only one of the possible values.

The predetermined mapping is formed by manipulating at least one of the possible remainders such that a first of the remainders refers via a minimum mapping distance to a second of the remainders, such that a mapping path of the first remainder to the selected video parameter value is established by a mapping path associated with the second remainder. The mapping may be configured to reduce at least one of a manipulation frequency and a manipulation cost associated with the selecting. The mapping may also configured to optimise a rate/distortion balance by adjusting each of the manipulation frequency and the manipulation cost associated with the selecting.

In a preferred implementation the mapping is a first mapping determined according to a first frequency of occurrence of the values, the method further comprising:

monitoring a frequency of occurrence of the video parameter values, detecting a matching of the frequency of occurrence with a predetermined threshold, creating a second mapping configured according to a second frequency of occurrence the values, and changing the selecting from a first mapping to use the second mapping.

The mapping is configured to reduce at least one of a manipulation frequency and a manipulation cost associated with the adjusting.

Other aspects are also disclosed.

BRIEF DESCRIPTION OF THE DRAWINGS

At least one embodiment of the present invention will now be described with reference to the following drawings, in which:

FIG. 9 is a diagram illustrating an alternate example mapping of MVComp flag values to modulo results;

FIG. 10 is a diagram illustrating an alternate example mapping of MVComp flag values to modulo results;

DETAILED DESCRIPTION INCLUDING BEST MODE

A Video Encoder

Figure 1:
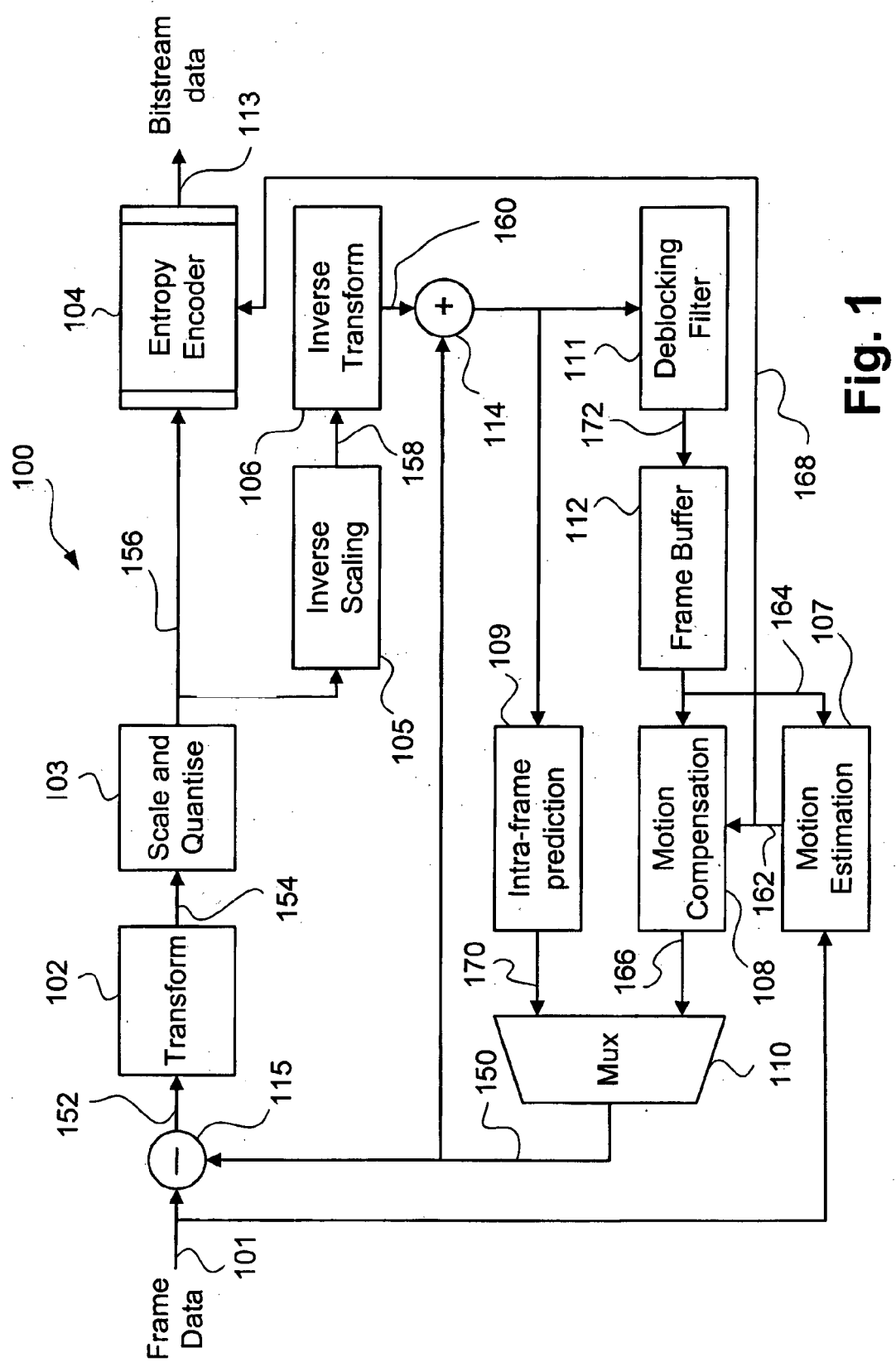
FIG. 1 is a schematic block diagram representation of a video encoder.

FIG. 1 shows a schematic block diagram illustrating functional blocks of video encoder 100. Although the schematic block diagram is illustrative of an H.264/MPEG-4 AVC video decoding pipeline, the stages depicted are common to other video codecs such as VC-1 or the High Efficiency Video Coding (HEVC) standard under development. The video encoder 100 receives unencoded frame data 101 as a series of frames including luminance and chrominance samples. The video encoder 100 divides each frame of the video data 101 into, one or more slices which contain an integer number of Coding Units. Each Coding Unit is encoded sequentially by further dividing the Coding Unit into two-dimensional arrays of samples, known as blocks. The video encoder 100 operates by outputting from a multiplexer block 110 a prediction 150 for each array of samples and using a subtracter 115 to find the difference 152 between the prediction 150 and a corresponding array of samples received from the frame data 101. The prediction 150 from the multiplexer block 110 will be described in more detail below. The difference 152 is received by transform block 102, which transforms the difference 152 by converting the difference 152 from a spatial representation to a frequency domain representation 154 to create transform coefficients. For H.264/MPEG-4 AVC the conversion to the frequency domain representation is implemented using a modified discrete cosine transform (DCT), modified to be implemented using shifts and additions. The transform coefficients 154 are then input to a quantiser block 103 where the coefficients 154 are scaled and quantised to produce residual coefficients 156. The scale and quantise block 103 scales and quantises the transform coefficients 154, resulting in a loss of precision. The residual coefficients 156 are taken as input to an inverse scaling block 105 which reverses the scaling performed by the scale and quantise block 103 to produce rescaled versions 158 of the transform coefficients. Due to the loss of precision resulting from the scale and quantise block 103 these rescaled transform coefficients 158 are not identical to the original transform coefficients 154. The rescaled transform coefficients 158 from the inverse scaling block 105 are then output to an inverse transform block 106. The inverse transform block 106 performs an inverse transform from the frequency domain to the spatial domain to produce a spatial-domain representation 160 of the rescaled transform coefficients.

A motion estimation block 107 produces motion vectors 162 by comparing the frame data 101 with previous frame data 164 stored in a frame buffer block 112. The motion vectors 162 are then input to a motion compensation block 108 which produces inter-predicted reference samples 166 by filtering samples stored in the frame buffer block 112, taking into account a spatial offset derived from the motion vectors 162. The motion vectors 162 are also passed as syntax elements 168 to an entropy encoder block 104 for coding in an output bitstream 113. An intra-frame prediction block 109 produces intra-predicted reference samples using samples 170 obtained from a sum 114 of the output of the multiplexer block 119 and the output 160 from the inverse transform block 106.

Coding Units may be coded using intra-prediction or inter-prediction. This decision is made according to a rate-distortion trade-off between the desired bit-rate of the resulting bitstream and the amount of image quality distortion introduced by either coding technique. The multiplexer block 110 selects either the intra-predicted reference samples 170 from the intra-frame prediction block 109, or the inter-predicted reference samples 166 from the motion compensation block 108, depending on the current Coding Unit mode. A summation block 114 produces a sum that is input to a deblocking filter block 111. A deblocking filter block 111 perform s filtering along block boundaries, producing deblocked samples 172 that are written to the frame buffer block 112. The frame buffer block 112 is a buffer with sufficient capacity to hold data from multiple frames for future reference.

The entropy encoder block 104 produces syntax elements from incoming residual coefficient data 156 received from the scale and quantise block 103 and motion vector data 168 from the motion estimation block 107. The entropy encoder block 104 outputs bitstream data 113 and will be described in more detail below.

For a given video coding algorithm, one of the supported entropy coding schemes is selected according to the configuration of the encoder 100.

A Video Decoder

Figure 2:
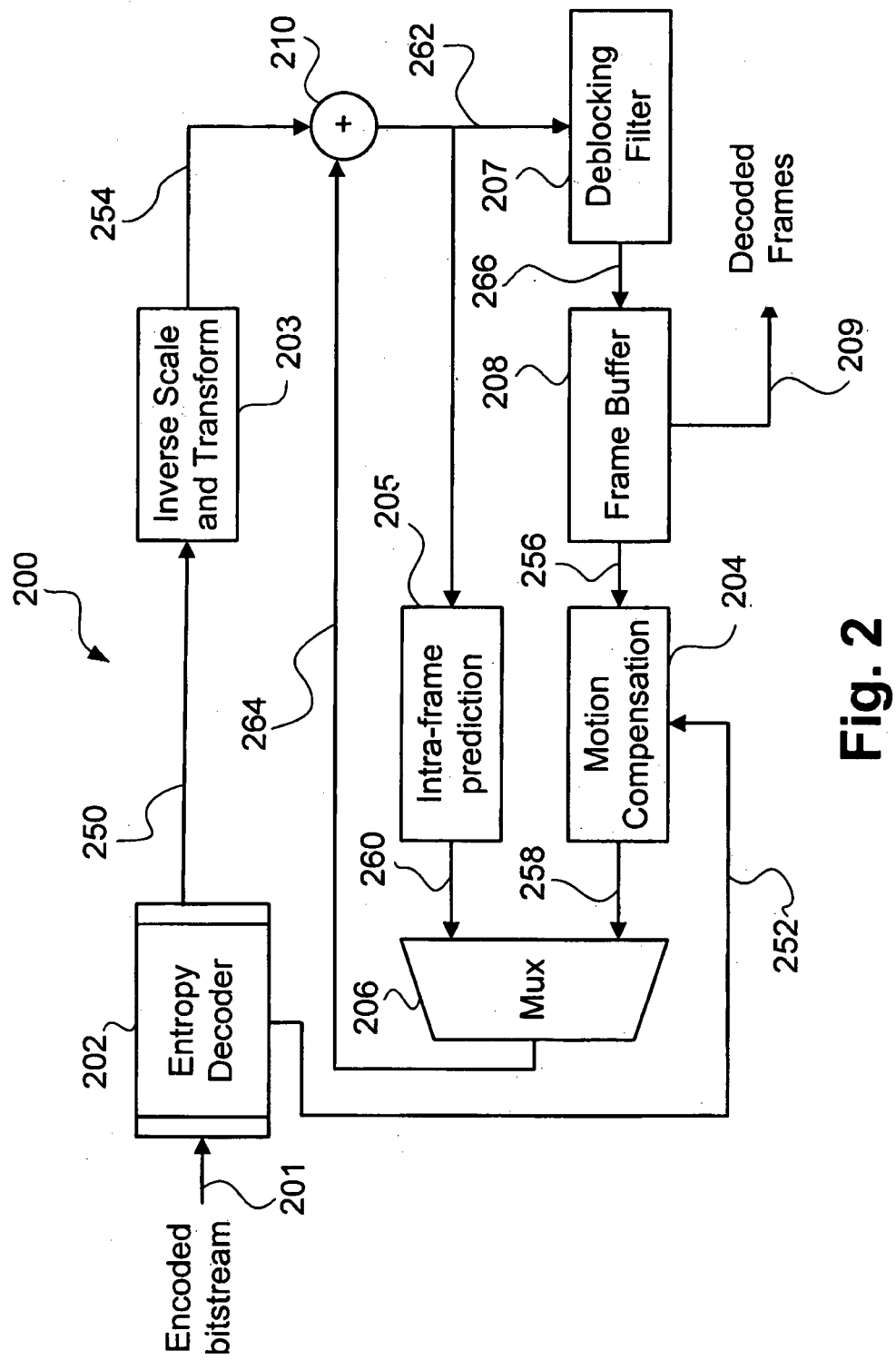
FIG. 2 is a schematic block diagram representation of a video decoder.

FIG. 2 is a schematic block diagram illustrating the functional blocks necessary to realise a video decoder 200. Although the schematic block diagram is illustrative of an H.264/MPEG-4 AVC video decoding pipeline, the stages depicted are common to other video codecs, such as MPEG-2, VC-1 and HEVC, that employ entropy coding. Firstly, an encoded bitstream 201 is received by the video decoder 200 and corresponds to the bitstream data 113. The encoded bitstream 201 may be read from a disk, CD-ROM, Blu-ray disk or other physical storage medium. Alternatively the encoded bitstream 201 may be received from an external source such as a network connection or a radio-frequency receiver. The encoded bitstream 201 consists of encoded syntax elements representing frame data to be decoded. The encoded bitstream 201 is input to an entropy decoder block 202 which extracts the syntax elements from the encoded bitstream 201 and passes the values of these syntax elements to other blocks in the video decoder 200. Syntax element data representing residual coefficient information 250 is passed to an inverse scale and transform block 203 and syntax element data representing motion vector information 252 is passed to a motion compensation block 204. The inverse scale and transform block 203 performs inverse scaling on the residual coefficient data 250, restoring the residual coefficients to their correct magnitude, and then performs an inverse transform to convert the data from a frequency domain representation to a spatial domain representation, producing residual samples 254.

The motion compensation block 204 uses the motion vector data 252 combined with previous frame data 256 from a frame buffer block 208 to produce inter-predicted reference samples 258. When a syntax element indicates that the current Coding Unit was coded using intra-prediction, an intra-frame prediction block 205 produces intra-predicted reference samples 260 using a sum 262 from a summation block 210. A multiplexer block 206 selects intra-predicted reference samples 260 or inter-predicted reference samples 258 depending on the current Coding Unit type, which is indicated by a syntax element in the bitstream 201. An output 264 from the multiplexer block 206 is added to the residual samples 254 from the inverse scale and transform block 203 by the summation block 210 to produce the sum 262 which is (also) input to a deblocking filter block 207. The deblocking filter block 207 performs filtering along the block boundaries to smooth artefacts visible along the block boundaries. An output 266 of the deblocking filter block 207 is written to the frame buffer block 208. The frame buffer block 208 provides sufficient storage to hold multiple decoded frames for future reference. Decoded frames 209 are also output from the frame buffer block 208.

Video Parameters

A video parameter in the field of video coding is a data element that indicates a characteristic of the video sequence being encoded, and thus the encoded video sequence. A video parameter therefore pertains to a set of video data to be encoded or decoded. The video parameter is encoded into the bitstream 113/201 by the video encoder 100 and is interpreted by the video decoder 200 during the process of decoding the encoded video sequence to indicate a characteristic of the video sequence. Amongst the various video coding standards in use and those being developed, a variety of video parameters exist, each representing a characteristic of the type of coding being used or of the data being coded. Examples of video parameters include the MPM flag and the MVComp flag proposed to the HEVC standard under development, and the intra_chroma_pred_mode parameter in the H.264/MPEG-4 AVC standard, to name but a few. Such video parameters may be determined at a variety of stages within the encoder 100 and similarly utilised at a variety of stages within the decoder 200. Typically in the encoder 100, video parameters are encoded into the bitstream in the entropy encoder unit 104 having been identified, set or otherwise established by other processes within the encoder 100. Typically, video parameters are decoded from the bitstream 201 by the entropy decoder 202, thereby being made available to processes within the decoder 200 for the decoding of the video bitstream to reveal the decoded frames 209.

Video parameters need not be determined from the video data, but may alternatively or additionally be input to the encoder 100, for example as metadata associated with image capture. Such metadata may be in an XML format and may include location (e.g. GPS) data, or camera captures settings, to offer just a few examples.

The present disclosure is concerned with efficient approaches to the encoding and decoding of a video parameter, noting that different video parameters may be encoded and decoded in different ways according to their form or structure. Specific approaches to encoding and decoding may be appropriate to specific one of the video parameters.

A video parameter can take on one of n possible values, where n depends on the nature of the video parameter. For example, the video parameter could be represented by a binary flag in the case where the video parameter may have either one of two values. If the video parameter could take on one of three possible values, the parameter can be represented by a ternary flag.

Computing Environment

Figure 13A:
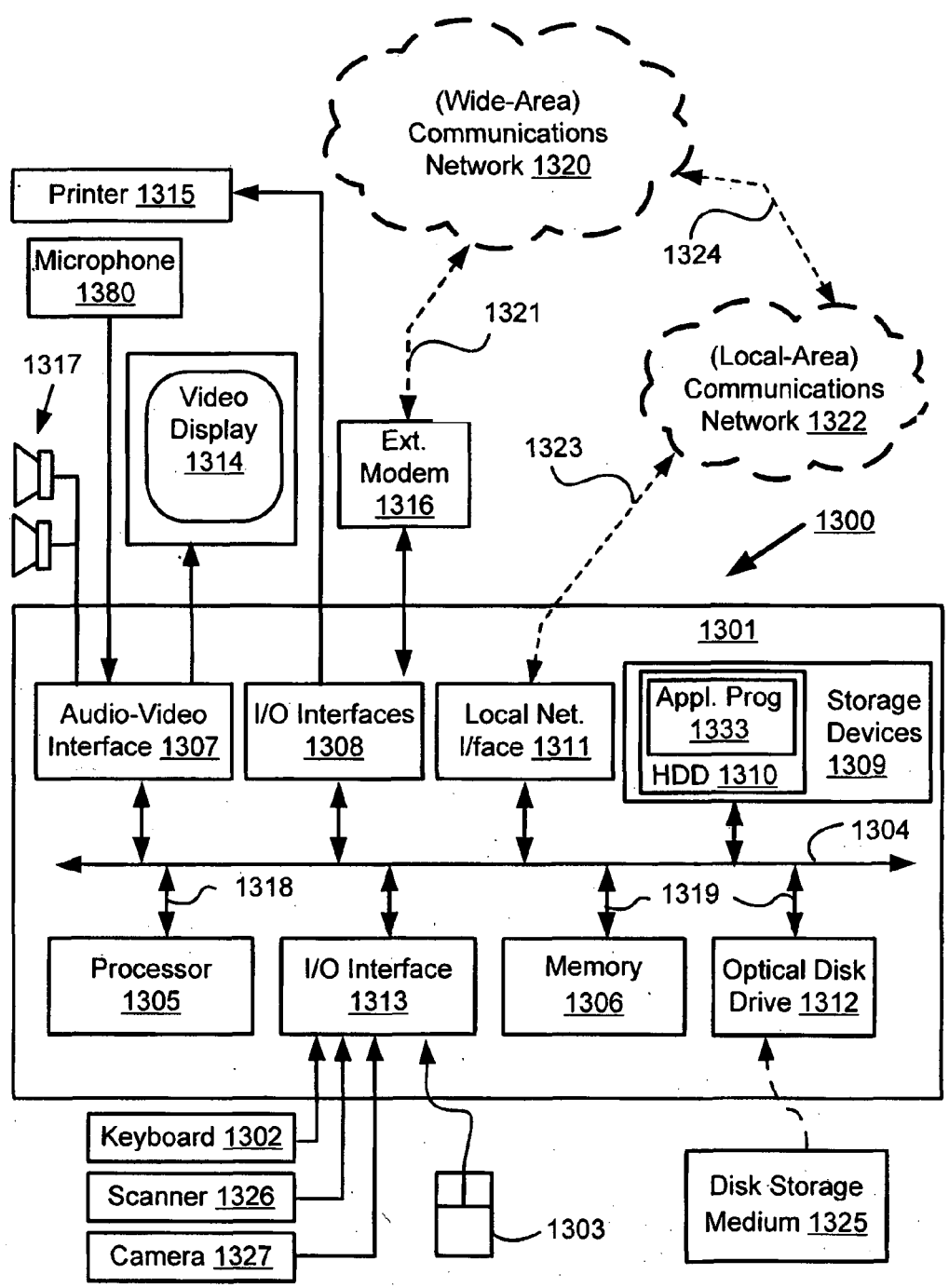
FIGS. 13A and 13B collectively form a schematic block diagram representation of general purpose computer system upon which the arrangements described may be practiced.
Figure 13B:
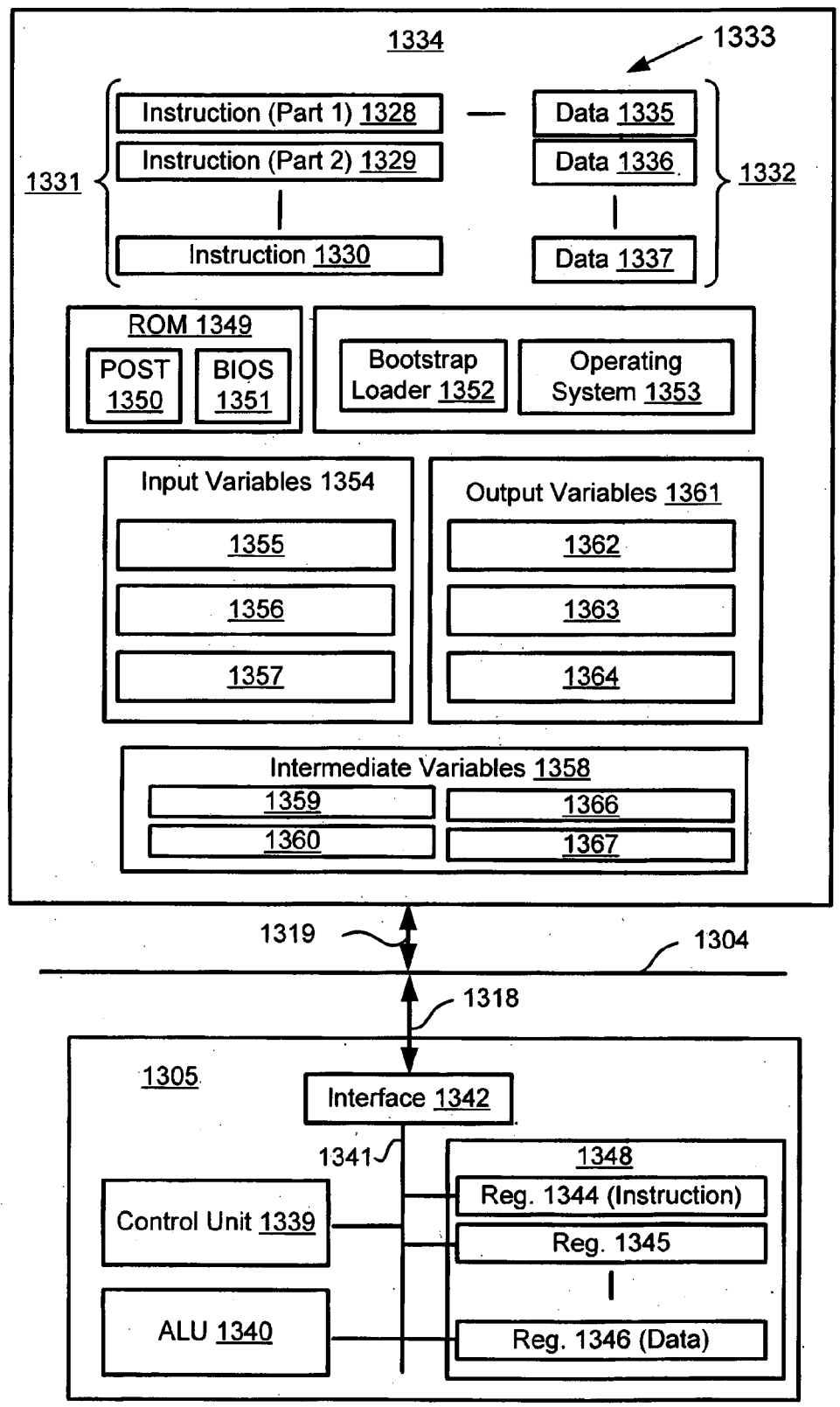

FIGS. 13A and 13B depict a general-purpose computer system 1300, upon which the various arrangements illustrated in FIGS. 1 and 2 and to be described can be practiced. The computer system 1300 may be configured to operate as either one or both of the encoder 100 and the decoder 200.

As seen in FIG. 13A, the computer system 1300 includes: a computer module 1301; input devices such as a keyboard 1302, a mouse pointer device 1303, a scanner 1326, a camera 1327, and a microphone 1380; and output devices including a printer 1315, a display device 1314 and loudspeakers 1317. An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes an number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 13A, the local communications network 1322 may also couple to the wide network 1320 via a connection 1324, which would typically include a so-called "firewall" device or device of similar functionality. The local network interface 1311 may comprise an Ethernet™ circuit card, a Bluetooth™ wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or a like computer systems.

The methods of video encoding and/or decoding may be implemented using the computer system 1300 wherein the processes of FIGS. 1 to 12, may be implemented as one or more software application programs 1333 executable within the computer system 1300. In particular, the steps of the encoding/decoding methods are effected by instructions 1331 (see FIG. 13B) in the software 1333 that are carried out within the computer system 1300. The software instructions 1331 may be formed as one or more code modules, each for performing one or more particular tasks. The software may also be divided into two separate parts, in which a first part and the corresponding code modules performs the encoding/decoding methods and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for encoding and/or decoding video data.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for encoding and/or decoding video data.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 13B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 13A.

When the computer module 1301 is initially powered up, a power-on self-test (POST) program 1350 executes. The POST program 1350 is typically stored in a ROM 1349 of the semiconductor memory 1306 of FIG. 13A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 13A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 13A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 13B, the processor 1305 includes a number of functional modules including a control unit 1339, an arithmetic logic unit (ALU) 1340, and a local or internal memory 1348, sometimes called a cache memory. The cache memory 1348 typically include a number of storage registers 1344-1346 in a register section. One or more internal busses 1341 functionally interconnect these functional modules. The processor 1305 typically also has one or more interfaces 1342 for communicating with external devices via the system bus. 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1105 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 13A. The execution of a set of the instructions may in some cases result in output of data. Execution may also involve storing data or variables to the memory 1334.

The disclosed encoding/decoding arrangements use input variables 1354, which are stored in the memory 1334 in corresponding memory locations 1355, 1356, 1357. The encoding/decoding arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 13B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:

(a) a fetch operation, which fetches or reads an instruction 1331 from a memory location 1328, 1329, 1330;

(b) a decode operation in which the control unit 1339 determines which instruction has been fetched; and (c) an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 1-12 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The methods of encoding and/or decoding may alternatively be implemented in dedicated hardware such as one or more integrated circuits performing the functions or sub functions of encoding and decoding. Such dedicated hardware may include graphic processors, digital signal processors, or one or more microprocessors and associated memories particularly configured to perform one or more of the operations illustrated in FIGS. 1 and 2 already described or the processing of FIGS. 3 to 12 to be described.

Efficient Encoding of Video Parameters

There are various methods of encoding video parameters into an encoded bitstream representing a video sequence. The video parameter could be represented in a binary form as a series of one or more bits. These bits could collectively represent a syntax element (or a binarised syntax element in the case of arithmetically encoded syntax elements), and the syntax element could be inserted into the bitstream such that the bitstream size in increased by the number of bits in the syntax element.

Alternatively, to lower the bitstream size, the video parameter could be encoded into the bitstream by embedding the video parameter in existing information in the bitstream. The video parameter can be embedded in a modulo remainder of the result of a function applied to the information in the bitstream. Such a function may be termed a modulo dividend function which is applied to a set of video data, in which the video parameter is to be encoded, to produce a single integer value, which is defined as the modulo dividend. A mapping can be used to map the values of the video parameter to the values of the modulo remainder.

The presently described arrangements provides a method of embedding a video parameter inside existing information in the bitstream using a tailored n:1 mapping which ameliorates the adverse consequences of the embedding process, such as the frequency and extent of changes required to be made to the existing syntax elements in the bitstream.

The 5 Configuration Parameters

Five configuration parameters are required and used by both the video encoder 100 and the video decoder 200 in order to apply the embedding technique disclosed herein. These Five Configuration Parameters Are:

1. the video parameter to be encoded by, the disclosed encoding technique, including characteristics of the video parameter such as the number of states the video parameter can occupy and the meaning of those states;

2. a set of video data in which the video parameter is to be embedded;

3. a modulo dividend function to be applied to the set of video data which will output a single integer value, the modulo dividend, to which a modulo operator will be applied;

4. a base of the modulo operator to be applied to the modulo dividend, and 5. a mapping between modulo result values and the video parameter values.

These five configuration parameters can be determined according to the needs of specific implementations of the arrangements presently described. Specific determinations for these five configuration parameters will now be described according to a particular implementation and some alternate implementations of video coding used by the encoder 100 and decoder 200. Those skilled in the art will appreciate that the five configuration parameters can be set to other values.

1. The Video Parameter

In a particular first implementation, the video parameter is the Most Probable Mode (MPM) flag as represented in the current version of the HEVC standard under development. The MPM flag is a binary flag which is set for each prediction unit, =within each frame of the video sequence. A prediction unit is a two dimensional block of video data within a video frame, upon which a particular prediction mode is applied during encoding and decoding. Prediction units are generated during encoding, for example with the intra-frame prediction module 109, and also used during decoding, for example by the intra-frame prediction module 205. The MPM flag represents whether the most probable prediction mode was applied to the specific prediction unit during encoding by the encoder 100. At the decoder 200, the MPM flag represents whether the most probable prediction mode should be utilised for the specified prediction unit when decoding the video sequence.

In alternative implementations, any video parameter may be encoded using the disclosed encoding technique. Ternary or binary state video parameters are more easily embedded within the set of video data as they encompass less information, but higher order video parameters can also be embedded using the disclosed method.

Examples of how video parameters other than the MPM flag can be embedded using this method are described further in this description.

2. The Set of Video Data

In the particular implementation, the set of video data selected in which to embed the video parameter is the set of residual coefficients contained within a single prediction unit. The residual coefficients are represented within the frequency domain. In the video encoder 100 of FIG. 1, the residual coefficients are output 156 from the scale and quantise block 103. In the video decoder 200 of FIG. 2, the residual coefficients are some of the outputs 250 from the entropy decoder block 202.

Figure 3A:
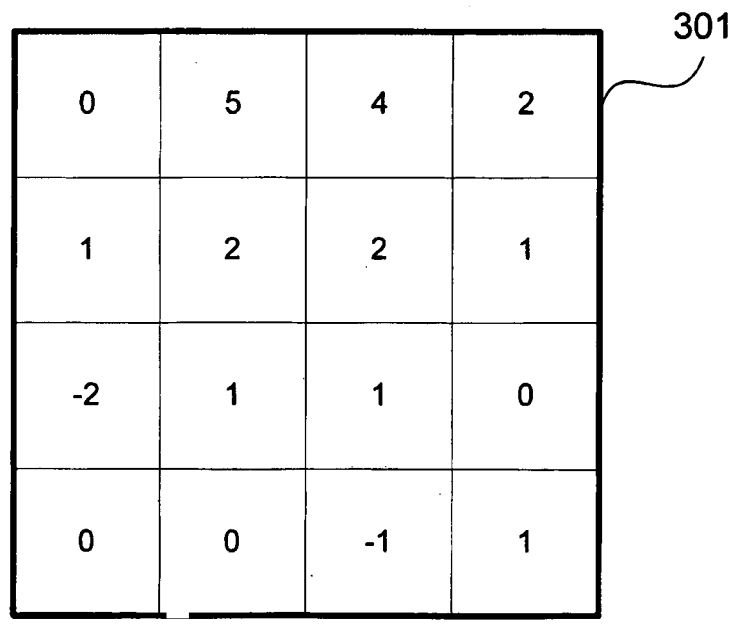
FIGS. 3A and 3B illustrate an example set of residual coefficients.

FIG. 3A shows an exemplary set of residual coefficients within a 4×4 prediction unit, such as the output from the scale & quantise unit 103 of the encoder 100, and output from the entropy decoder 202 of the decoder 200. In this example for the particular implementation, these 16 residual coefficients form the set of video data in which the video parameter is embedded.

In alternative implementations, the set of video data may include a subset of the residual coefficients within a prediction unit, or additional syntax elements as well as the residual coefficients or syntax elements alternative to residual coefficients.

3. The Modulo Dividend Function

The modulo dividend function is the function applied to the set of video data to produce a single integer value, which is defined as the modulo dividend.

In the particular implementation the modulo dividend function is a summing or aggregate function whereby all elements within the set of video data are summed, using their signed value, to produce the modulo dividend. As such, all of the sixteen residual coefficient shown in the example of FIG. 3A are summed, using their signed values to produce a modulo dividend with an aggregate value of 17.

In alternative implementations, the modulo dividend function could include operations other than the sum operation or one or more alternates to the sum operation. For example, an alternative modulo dividend function is a weighted sum function, in which video data elements, in which the video parameter is to be encoded, contribute unequally to the derivation of the modulo dividend. The modulo dividend function is generally an aggregation function intended to bring a collection of items together as one quantity. Whilst the described implementations are based on summing functions, the aggregate may alternatively or additionally be obtained using other functions such as multiply, divide or subtract. The function aims to take a variety of numbers (e.g. the coefficients of FIG. 3A) and to evaluate those numbers into a single unsigned integer representative of the portion of the video data to be encoded. Any function that can achieve this may be useful.

4. The Base of the Modulo Operator

The modulo operator determines the remainder of division of a number, the modulo dividend, by another number, the divisor. In this description, the remainder will be known as the modulo result and the divisor, being a predetermined number, will be known as the modulo base.

In the particular implementation described herein, the modulo base is 4. In alternative implementations, the modulo base can be any number greater than the number of value states of the video parameter. It can be desirable to select modulo bases that are powers of two as this facilitates less complex implementations.

5. The Mapping between the Modulo Result and the Video Parameter

The mapping maps the video parameter value to a corresponding modulo result and also maps the modulo result to a corresponding video parameter value. Both the video encoder 100 and the video decoder 200 maintains a look-up table containing a number of information pairs equivalent to the modulo base. Each information pair consists of a video parameter value and a modulo result value pair.

There is one video parameter value for each modulo result, however there can be more than one corresponding modulo result for a specific video parameter value.

A mapping is tailored to suit the characteristics of the video parameter being encoded/embedded into the set of video data. The derivation of the tailored mapping is described in further in this description.

Encoding a Video Sequence

Figure 4:
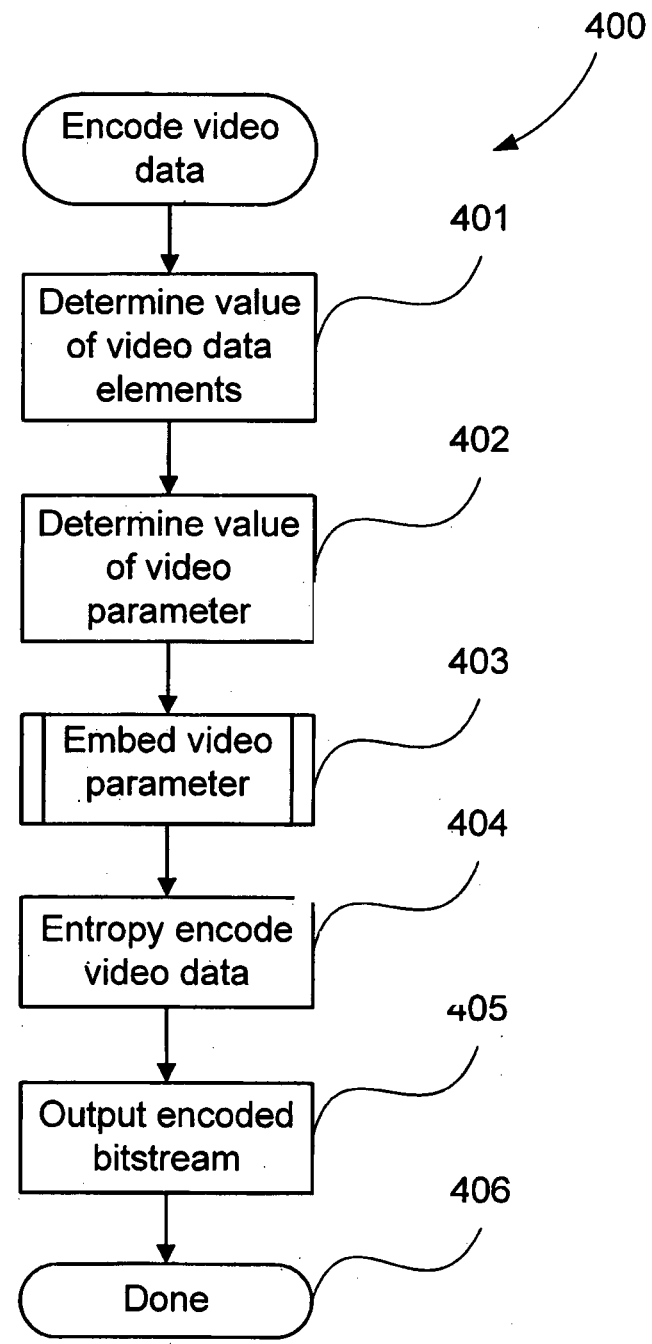
FIG. 4 is a schematic flow diagram illustrating a method of encoding video data according to the present disclosure.

FIG. 4 shows the method 400 for encoding a video sequence according to the present disclosure. The method 400 may be implemented in software stored on the HDD 1310 and executable by the processor 1305 and is operative upon video data input or otherwise stored in the computer 1301 and for forming a bitstream for storage upon the HDD 1310 or for transmission over the networks 1320/1322. In step 401 the video encoder 100 determines the value of all the video data syntax elements. One of these video data syntax elements is the video parameter to be embedded in the set of video data. In step 402 the video encoder 100 determines the value of the video parameter. In step 403, which is described in more depth in FIG. 5, the video encoder 100 embeds the video parameter into the set of video data. In step 404, the video encoder 100 entropy encodes all the video data syntax elements and, in step 405, the entropy encoded bitstream is output from the video encoder 100.

Natural Modulo Result and Desired Modulo Result

Figure 5:
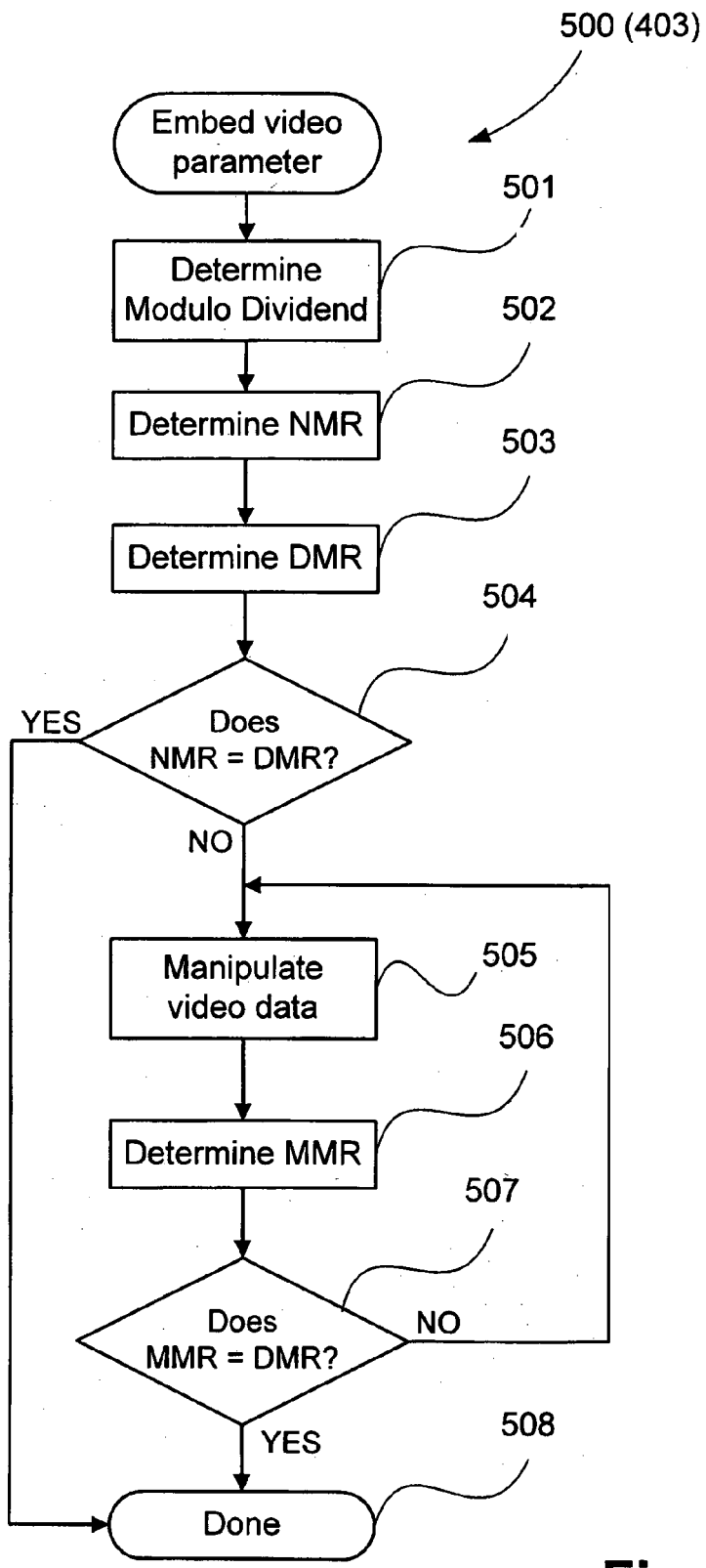
FIG. 5 is a schematic flow diagram illustrating a method embedding a video parameter in a set of video data according to the present disclosure.

FIG. 5 shows the process 500 (403) performed by the video encoder to embed a video parameter in the set of video data.

Firstly, the video encoder 100 determines the modulo dividend 501 by applying the modulo dividend function to the set of video data. The video encoder 100 then determines a natural modulo result (NMR) in step 502. The natural modulo result is the modulo value that is produced when the modulo operator is applied to the modulo dividend.

Next, the video encoder 100 determines a desired modulo result (DMR) in step 503. The desired modulo result is the value that accurately indicates the video parameter value according to the mapping between the modulo result and the video parameter.

In step 504, the video encoder 100 determines whether the natural modulo result is equal to the desired modulo result. In a percentage of cases, the natural modulo result will be equal to the desired modulo result. In these cases, there is no need to perform any additional steps in order to encode the video parameter into the bitstream, and the video encoder 100 proceeds to step 508 where the process 500 (403) concludes and encoding returns to step 404.

In the remaining cases, the natural modulo result will not be equal to the desired modulo result. In these cases, it is necessary to manipulate the set of video data in such a way as to ensure the modulo result determined from the manipulated video data is equal to the desired modulo result. If the natural modulo result is not equal to the desired modulo result the encoder 100 will proceed to step 505 and manipulate the set of video data.

In the example of FIG. 3A for the first implementation, the modulo dividend is 17 and the modulo base is 4. This results in a natural modulo result of 1 (i.e. 17/4=4, with remainder 1). In the example for the first implementation; the value of the MPM flag is 0, which is represented by the desired modulo result value 0, according to the exemplary mapping shown in FIGS. 7A and 7B. Therefore, in the first implementation, the natural modulo result does not equal the desired modulo result.

Manipulating Video Data to Embed the Video Parameter

In the first implementation an iterative approach is used to manipulate the video data to achieve the desired modulo result. In the first implementation the video data elements are manipulated, in step 505, through the process of randomly selecting one of the video data elements, of the set of video data elements 301, and randomly adjusting the integer value of that selected video data element through the addition or subtraction of one integer value.

Figure 3B:
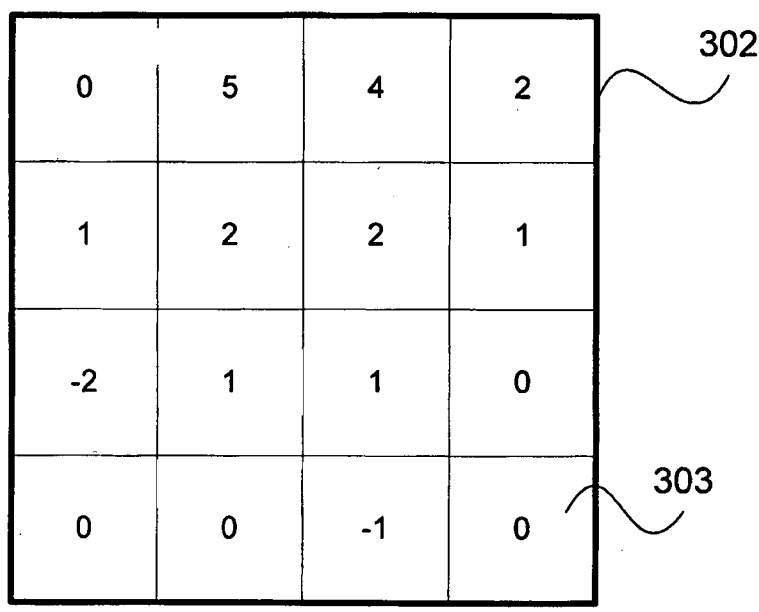

In the initial execution of step 505, the video data elements 301, seen in FIG. 3A, are manipulated to produce manipulated video data elements 302, seen in FIG. 3B. In subsequent executions of step 505, when required, the video data elements 302, in FIG. 3B, are manipulated to produce further manipulated video data elements.

FIG. 3B, shows an example of the possible values for manipulated video data resulting from step 505. Video data elements 302 are the result of applying step 505 to the original video data elements 301. As seen by comparing FIGS. 3A and 3B, video data element 303 is the only video data element in the set of elements 302 that has been manipulated by step 505, in this example. Video data element 303 was randomly selected for manipulation and was adjusted by one integer level, through the subtraction of the value 1, to give a manipulated video data element value of 0.

Applying the modulo dividend function to the manipulated video data 302 of FIG. 3B produces a modulo dividend of 16. A modulo result value of 0 is produced when the modulo operator for the first implementation is applied to this modulo dividend (16 mod 4=0). The manipulated video data 302 therefore produces a manipulated modulo result that equals the desired modulo result for the first implementation. The manipulated modulo result, 0, maps, via the mapping seen in FIG. 7A, to the desired video parameter value, 0, Therefore, the video data in FIG. 3B satisfies the condition of step 507 in process 500.

In alternative implementations, the set of video data may be manipulated in methods alternate to the method applied by step 505. Alternative video data manipulation methods include methods that deliberately select one or more specific video data elements for manipulation to minimise the impact that the manipulation would have on the quality of the video sequence being encoded.

Further alternate video data manipulation methods include methods that are deterministic rather than random. For, example, when, the modulo dividend function applied to the set of video data is a basic sum function, it is possible for the encoder 100 to determine, prior to manipulation, exactly how the video data can be manipulated to achieve the desired modulo result. This is because, for a modulo dividend function that is a basic sum function, the mapping distance is exactly the same as the extent to which a video data element must be manipulated.

Mapping Distance

Mapping distance is a measure of the difference between the natural modulo result and the desired modulo result (or the closest desired modulo result, where a plurality of desired modulo results exist) and is described further in this description. In all situations, knowledge of the required mapping distance as well as the modulo dividend function is required to avoid a 'trial and error' approach to video data manipulation.

Manipulation Modulo Result (MMR)

The manipulated modulo result (MMR) is calculated by the video encoder 100 in step 506 by applying the modulo dividend function to the manipulated set of video data to produce the modulo dividend, and then applying the modulo operator to the modulo dividend.

In step 507, the video encoder 100 compares the manipulated modulo result to the desired modulo result. If the manipulated modulo result is equal to the desired modulo result, the video encoder 100 proceeds to step 508. However, if the manipulated modulo result does not equal the desired modulo result, the video encoder 100 returns to and repeats steps 505 and 506, until such time as the condition of step 507 is met, thereby repeatedly manipulating the video data element.

Decoding the Video Parameter

Figure 6:
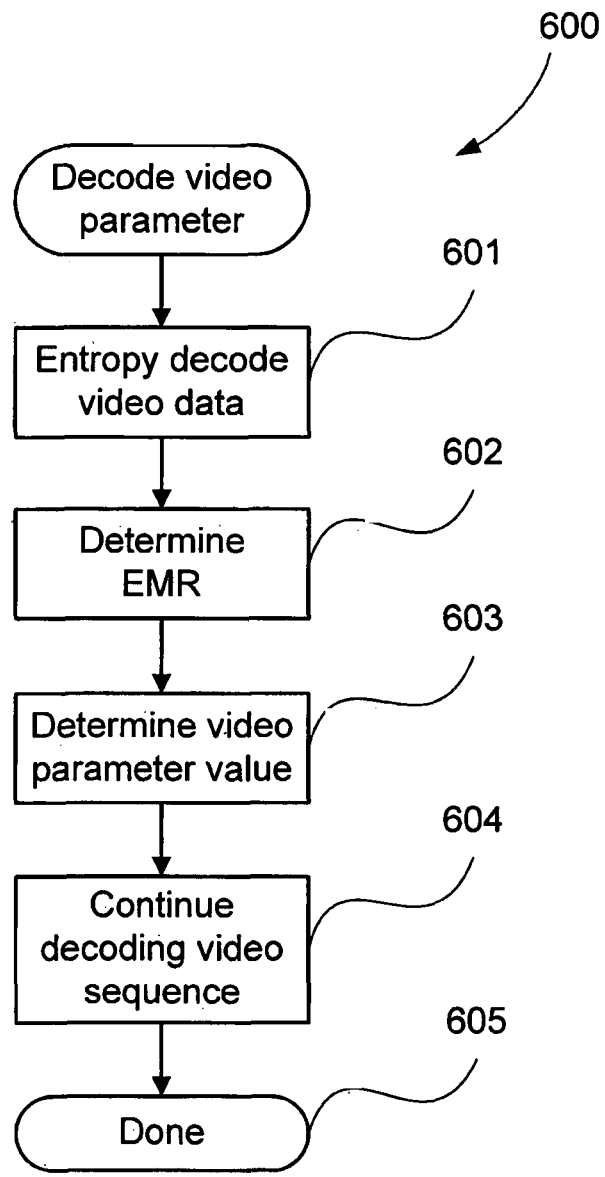
FIG. 6 is a schematic flow diagram illustrating a method of decoding a video parameter according to the present disclosure.

FIG. 6 shows a method 600 for decoding a video parameter from a video sequence according to the first implementation. In step 601, the video decoder 200 entropy decodes the encoded bitstream 201 to produce video data syntax elements 250 describing a frame of the video sequence. In step 602, the video decoder 200 determines an encoded modulo result (EMR). The EMR is the modulo result as determined by the decoder 100 by examining the decoded set of video data and is determined by firstly applying the modulo dividend function to the set of video data, to determine the modulo dividend, and then applying the modulo operator with the predefined modulo base to the modulo dividend.

In step 603, the video decoder 200 determines the value of the embedded video parameter by referencing the mapping with the encoded modulo result.

In step 604, the video decoder 200 continues decoding the video data, making use of the decoded video parameter until the video data is fully decoded, when the method 600 concludes at step 605.

What is a Parameter Value Distribution

A video parameter can have one of n possible values. The distribution of the frequency of occurrence of these n possible values depends upon the nature of the video parameter, and can depend on the characteristics of the video sequence being encoded.

In many situations, there is an expected distribution that approximately represents the actual distribution of the video parameter values. The expected distribution of the frequency of occurrence can be a predetermined attribute of the video parameter, or an attribute that changes dynamically as the video sequence is encoded.

In many circumstances the distribution of expected occurrences of each video parameter value is not evenly distributed.

Most Probable Mode Flag

For some video parameters there is an uneven expected frequency of occurrence across the possible video parameter values. Some video parameter values are expected to occur more frequently than others. One example of this is the Most Probable Mode (MPM) flag in the HM2.0 version of the HEVC standard, currently under development.

The Most Probable Mode flag is a binary flag that, when equal to '1', indicates that the prediction mode for the current prediction block is equal to the most probable prediction mode. When equal to '0', the Most Probable Mode flag indicates that the prediction mode for the current prediction block is not equal to the most probable prediction mode and an alternate mode must be determined using means known to both the encoder 100 and the decoder 200.

Due to the nature of the flag, the Most Probable Mode flag is equal to '1' more frequently than it is equal to '0'. As such, there is an uneven distribution in the expected occurrence for the values of the Most Probable Mode flag.

In the described example for the first implementation, the expected distribution of the frequency of occurrence for the MPM flag is 75% for value 1 and 25% for value 0. This expected distribution is static in the case of the described example for the first implementation, although in alternative implementations the expected distribution can change dynamically as the video sequence is encoded. This can reflect the expected or desired frequency of occurrence.

Problem with a 1:1 Map for MPM Flag

As a binary flag, the Most Probable Mode flag can be embedded inside a set of video data in the bitstream by applying a modulo operation with a modulo base of 2 to the modulo dividend.

The long term average distribution of naturally occurring modulo results, when the modulo base is 2, is 50% frequency for the modulo result value 0 and 50% frequency for the modulo result value 1. As such, in 50% of occurrences the modulo result will be equal to '1', and in 50% of occurrence the modulo result will be equal to '0'.

In the case of embedding the Most Probable Mode flag using a module base 2 operation, the naturally occurring modulo result will not be equal to the desired modulo result in approximately 50% of occasions. This 50% is comprised of the instances in which a modulo result of 0 is desired (25%) and a natural modulo result of 1 is obtained (50%), as well as the instances in which a modulo result of 1 is desired (75%) and the natural modulo result of 0 is obtained (50%).

Selecting the Modulo Base

For an uneven expected distribution of each of the possible video parameter values, a modulo base greater than the number of unique video parameter values, combined with an uneven mapping, will result in fewer instances in which manipulation of the video data is required. This means that there will be fewer instances in which the video data is altered away from the optimal values.

Uneven Mapping

An uneven mapping maps more than one modulo result to a single video parameter value. In the first implementation, the MPM flag has an expected distribution ratio of 20:80 for value 0 compared with value 1. To reduce the number of manipulations required to the set of video data, an uneven mapping is used with a modulo base of 4.

Figures 7A, 7B:
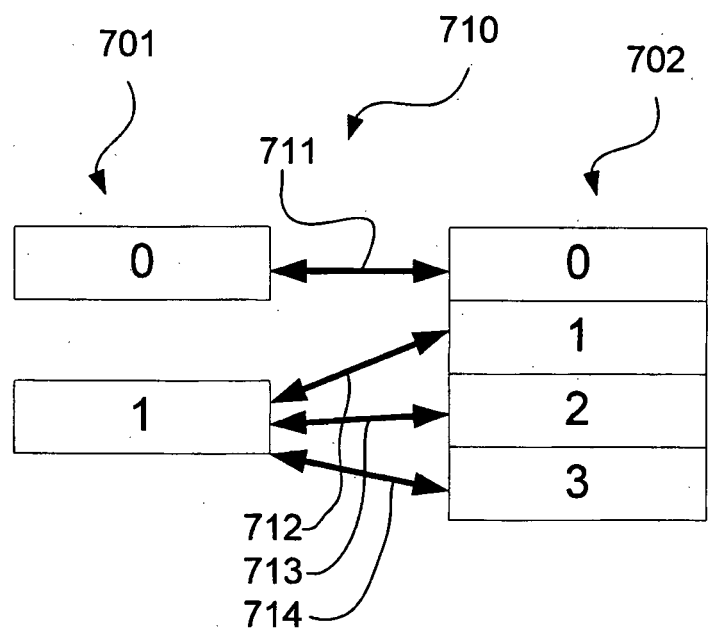
FIGS. 7A and 7B illustrate an example mapping of MPM flag values to modulo results.

FIG. 7A shows the uneven mapping, in a table representation, used for the MPM flag in the described example for the primary embodiment. A column 702 shows the values for the modulo result from a modulo operation with modulo base 4, and column 701 shows the values for the binary MPM flag. FIG. 7A shows in a tabular form that the MPM flag value 1 is mapped to three quarters of the possible modulo result values. Assuming a randomly distributed modulo dividend value, the modulo results 1, 2 and 3 will occur on average 75% of the time. FIG. 7B is a corresponding representation to FIG. 7A but better illustrating the specific mapping 710 between values in each of the columns 702 and 701. The mapping 710 in fact is seen to be two bidirectional sets of mappings—one from 0 to 0, and the other from one of 1, 2 or 3 to 1, and vice versa. In one direction, applicable to both encoding and decoding, the mapping 710 selects a specific mapping path 711-714 from the determined remainder 702 to a value for the video parameter 701 according to a frequency of occurrence of the value for the video parameter.

Multiple Desired Modulo Results

In an uneven mapping, there is a plurality of desired modulo results for a single video parameter value. In the example shown in FIGS. 7A and 7B, when the video parameter 701 has the value 1, there are three possible desired modulo results 702, being 1, 2 and 3. Those results represent the mapping 710 in the other direction to that mentioned above, from the video parameters 701 to the remainders 702. Either one of these three desired modulo results, obtained from corresponding mapping paths 712, 713, 714, as illustrated, could be used to accurately embed the video parameter in the video data during encoding.

Manipulation Frequency

Manipulation frequency is a measure of the percentages of instances on average that the natural modulo result does not equal the desired modulo result, or one of the desired modulo results if there is a plurality of desired modulo results. The manipulation frequency can be calculated by summing, for each unique video parameter value, the product of the frequency of occurrence of that video parameter value and the natural frequency of occurrence of a modulo result that is not the desired modulo result.

For the example shown in FIGS. 7A and 7B, the manipulation frequency is therefore the sum of the product of the frequency of occurrence of, the value 0 for the video parameter (20%) and the frequency of occurrence of any modulo result not equal to 0 (75%), and the product of the frequency of occurrence of the value 1 for the video parameter (80%) and the frequency of occurrence of any modulo result not equal to 1, 2 or 3 (25%). Therefore, the manipulation frequency for the example shown in FIGS. 7A and 7B is 20%*75%+80%*25%=35%.

Deriving a Tailored Mapping for Binary Video Parameter

An uneven mapping tailored to minimise the manipulation frequency for embedding a binary video parameter with an uneven expected distribution can be created by mapping all but one of the modulo result values to the video parameter value with the highest expected frequency of occurrence. The remaining single modulo result value is mapped to the video parameter value with the lower expected frequency of occurrence.

Deriving a Tailored Mapping for Ternary Video Parameter

An uneven mapping tailored to minimise the manipulation frequency for embedding a ternary video parameter with an uneven expected distribution can be created by mapping all but two of the modulo result values to the video parameter value with the highest expected frequency of occurrence. One of the two remaining modulo result values is mapped to one of the two video parameter values with the lower expected frequency of occurrence. The other remaining modulo result value is mapped to the other video parameter value with the lower expected frequency of occurrence.

Deriving a Tailored Mapping for Higher Order Video Parameter

An uneven tailored mapping may be used to minimise the manipulation frequency for embedding a video parameter with an uneven expected distribution across any number of values. Such an uneven mapping can be created by the following method.

The video parameter value with the highest frequency of occurrence is identified. If more than one video parameter value has the equal highest frequency of occurrence, then any one of the highest frequency video parameter values is selected as the video parameter with the highest frequency of occurrence. Each of the video parameter values with the less than highest frequency of occurrence are mapped to a single modulo result value. The video parameter value with the highest frequency of occurrence is mapped to all other available modulo result values.

Increasing the modulo base, and therefore the number of possible modulo result values in the mapping, can provide a mapping that further minimises the manipulation frequency. In terms of implementation complexity, there are limitations on the size and value of the modulo base that is feasible to implement. Modulo bases that are low powers of 2, such as four and eight are easier to implement in most architectures than modulo bases that are not powers of 2.

Figures 8A, 8B:
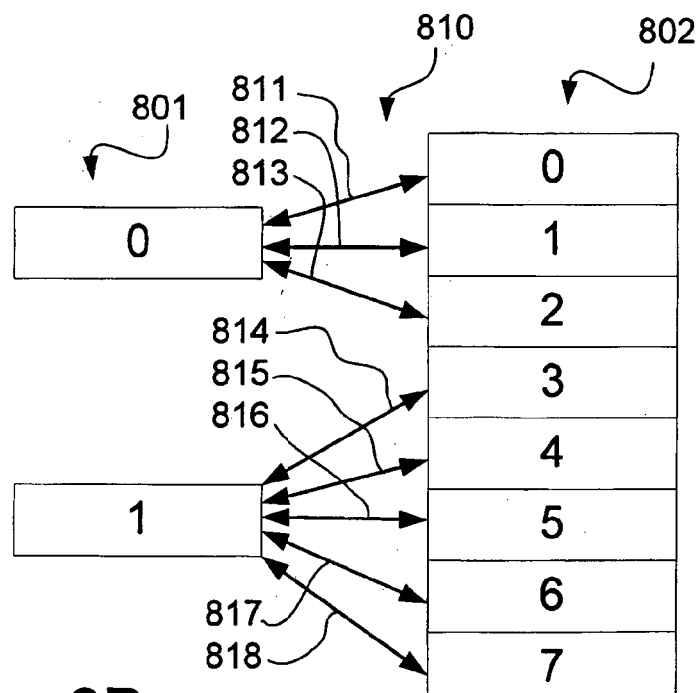
FIGS. 8A and 8B illustrate an example mapping of Video Parameter Value to modulo results.

FIGS. 8A and 8B show representations similar to FIGS. 7A and 7B of a generalised example mapping 810 for a binary flag that may be appropriate according to a variety of implementations. The mapping 810 has a modulo base of 8, meaning that there are 8 modulo result values 802 mapped via mapping paths 811-818 to the two unique video parameter values 801. In the example shown in FIG. 8A, the natural modulo result is given as 6, which in this case is mapped to the video parameter value 1. In the example shown in FIG. 8, the desired video, parameter value 801 is selected to be 0, therefore the desired modulo result value 802 is either 0, 1 or 2. Manipulating the modulo result from the value 6 to the value 2, shown by 803, would result in a mapping distance of 4 as the absolute difference between the integers 6 and 2 is 4. However, due to the nature of the modulo function, manipulation of the modulo result from a 6 to a 1, shown by 804, will result in a mapping distance of only 3, as the modulo result is wrapped around to produce a desired modulo result of 1. Represented arithmetically for the example natural modulo result value 6 and the example modulo dividend value 14:

14 mod 8=6 (the natural modulo result)

In order to force the desired modulo result of 0, the modulo dividend may be manipulated by either subtracting 6 or adding 2:

(14−6)mod 8=0 or (14+2)mod 8=0

Accordingly, the shortest absolute integer distance to achieve the desired modulo result is 2. This would be true for any value of the modulo dividend that produces a natural modulo result of 6.

The shortest mapping distance for the example shown in FIG. 8A is therefore produced by manipulating the natural modulo result of 6 to the desired modulo result of 0, shown by 805. This manipulation results in a mapping distance of only 2.

Mapping Distance Example

FIG. 9 shows an uneven mapping for a second implementation in which a Motion Vector Competition (MVComp) flag, as proposed for the HEVC standard under development, is embedded into a set of video data using a modulo operation with a modulo base of 8. The MVComp flag 901 represents the motion vector competition method utilised during encoding.

Similar to the first implementation, in the second implementation, the modulo dividend function is an unweighted sum of the residual coefficients within a prediction unit, thus again a simple aggregation of integer values.

In the example shown in FIG. 9, the MVComp flag value 0 has an expected frequency of occurrence of 38% (approx. ⅜) and the MVComp flag value 1 has an expected frequency of occurrence of 62% (approx. ⅝). The modulo results 902 have been mapped to the MVComp flag values 901 in an uneven mapping, as shown in FIG. 9, to minimise the number of video data manipulations required.

FIG. 9 also shows the minimum mapping distance 903 between each natural modulo result 902 and the closest modulo result value 902 that maps to an alternate video parameter value. These minimum mapping distances would be applied to the natural modulo result in the case that the natural modulo result does not equal the desired modulo result.

A video parameter mapping ratio is the ratio of the total number of each unique video parameter value, to the total number of each other unique video parameter value. The video parameter mapping ratio evident from FIG. 9, being 3:5, closely correlates with the expected distribution ratio for the MVComp flag (38:62), seen at time 1103 in FIG. 11, to be described.

The mapping in FIG. 9, which is akin to those shown in FIGS. 7B and 8B, is a basic mapping in which the modulo results and the MVComp flag values are mapped in numerically increasing order. The three MVComp flag=0 values 901 are assigned to the lowest three modulo results 902 (0, 1, 2), and the five MVComp flag=1 values 901 are assigned to the upper five modulo results 902 (3, 4, 5, 6, 7).

For FIG. 9, the maximum mapping distance arises when the natural modulo result is the value 5, as indicated at 904, but the value of the MVComp flag to be embedded is 0. In this case, the desired modulo result is either 0, 1 or 2. The smallest required mapping distance can be achieved by either manipulating the modulo result from a natural result of 5 to a manipulated result of 0, or to a manipulated result of 2. In either case the modulo result is manipulated by 3 integer intervals. Thus the maximum required mapping distance for the mapping shown in FIG. 9 is 3.

Overall Mapping Distance

The overall mapping distance is a combined measurement of the mapping distances for all combinations of natural modulo result and desired modulo result for a particular mapping.

In the second implementation, the overall mapping distance for the mapping shown in FIG. 9 is calculated by determining the minimum possible mapping distance 903 for each value of the MVComp flag 901, for each natural modulo result. The minimum mapping distances are then aggregated using a sum function to produce the overall mapping distance. The overall mapping distance for the mapping shown in FIG. 9 is 13.

i.e. (1+2+1)+(1+2+3+2+1)=13

In other implementations, the overall mapping distance for a mapping can be calculated using methods other than a sum of individual mapping distances. The largest minimum mapping distance may alternatively be used.

Optimised Mapping for Minimal Overall Mapping Distance

FIG. 10 shows an alternative mapping, to the mapping shown in FIG. 9, which reduces the overall mapping distance, yet provides the same video parameter mapping ratio of 3:5. The mapping of FIG. 10 is uneven.

In the mapping shown in FIG. 10, the MVComp flag values 1001 of 0 and 1 are interleaved within an ordered but uneven mapping 1001, to distribute the video parameter values across the range of modulo results 1002: In FIG. 10 as illustrated, the uneven mapping reveals a minimum mapping distance of 1 for each modulo result value, which reduces the frequency in which manipulation of the natural modulo result is required compared to the case shown in FIG. 9. The mapping shown in FIG. 10 has an overall mapping distance of 8.

Manipulation Cost

Manipulation cost is a measure of the absolute extent of manipulation to the video data set that is required to ensure the manipulated modulo result (MMR) is equal to a desired modulo result (DMR). Manipulation cost is therefore a measure of the deviation of the video data element values from the values that optimise the rate/distortion measure for the video sequence.

Manipulation Cost Depends on Modulo Dividend Function

The manipulation cost to the video data set depends not only on the structure of the mapping and the modulo base, but also on how the modulo dividend was calculated via the modulo dividend function.

In the second implementation, the modulo dividend function is an unweighted sum function, therefore the mapping distance exactly represents the manipulation cost to be applied across one or more video data elements.

In other implementations, where the modulo dividend function is more complex than a sum function, the mapping distance required may not be exactly the same as the manipulation cost required to be applied to the set of video data elements. In some cases, the manipulation cost required to be applied to the set of video data elements may not be easily determinable from the mapping distance. An iterative manipulation trial approach may be more feasible to implement in these cases.

Alternative methods of calculating the manipulation cost may operate by considering the modulo dividend function and the varying impact that each individual manipulation has on the bitstream size or the quality of the video sequence.

Minimising Manipulation Cost increases Manipulation Frequency

A mapping optimised to minimise both the mapping distance and the manipulation cost, may no longer be optimised to minimise, the manipulation frequency. As described earlier, the manipulation frequency is minimised when the most frequently occurring video parameter value is mapped to the greatest possible number of modulo result values. However, to minimise the mapping distance, it may be necessary to more evenly distribute the video parameter values across the modulo result values, such as seen in FIG. 10.

A useful implementation of a video encoder 100 can derive a mapping that minimises only one of manipulation frequency or manipulation cost, or minimise neither measure but rather creates a satisfactory balance between the two measures.

Dynamic Mapping

If the expected distribution for a video parameter remains relatively constant throughout the encoding of the video data, then a static mapping can be applied. However, if the distribution of the video parameter changes as the video data is encoded, due perhaps to changing characteristics of the video data content, then a mapping that adapts dynamically to the changing distribution will reduce the frequency of manipulation and the manipulation distance. In, this fashion, the frequency of occurrence may be calculated based on content of the video bitstream received before the portion of video data currently being processed.

Monitoring a Changing Expected Distribution

The video encoder 100 and the video decoder 200 monitor or detect the actual distribution (i.e. frequency of occurrence) of the video parameter values. Once a predefined threshold of probability distribution has been reached or matched, both the video encoder 100 and the video decoder 200 update or change the mapping and the modulo base, if required, to minimize the manipulation frequency or to minimize the manipulation cost, or to provide a satisfactory balance between manipulation frequency and manipulation cost.

Dynamic Mapping Example

Figure 11:
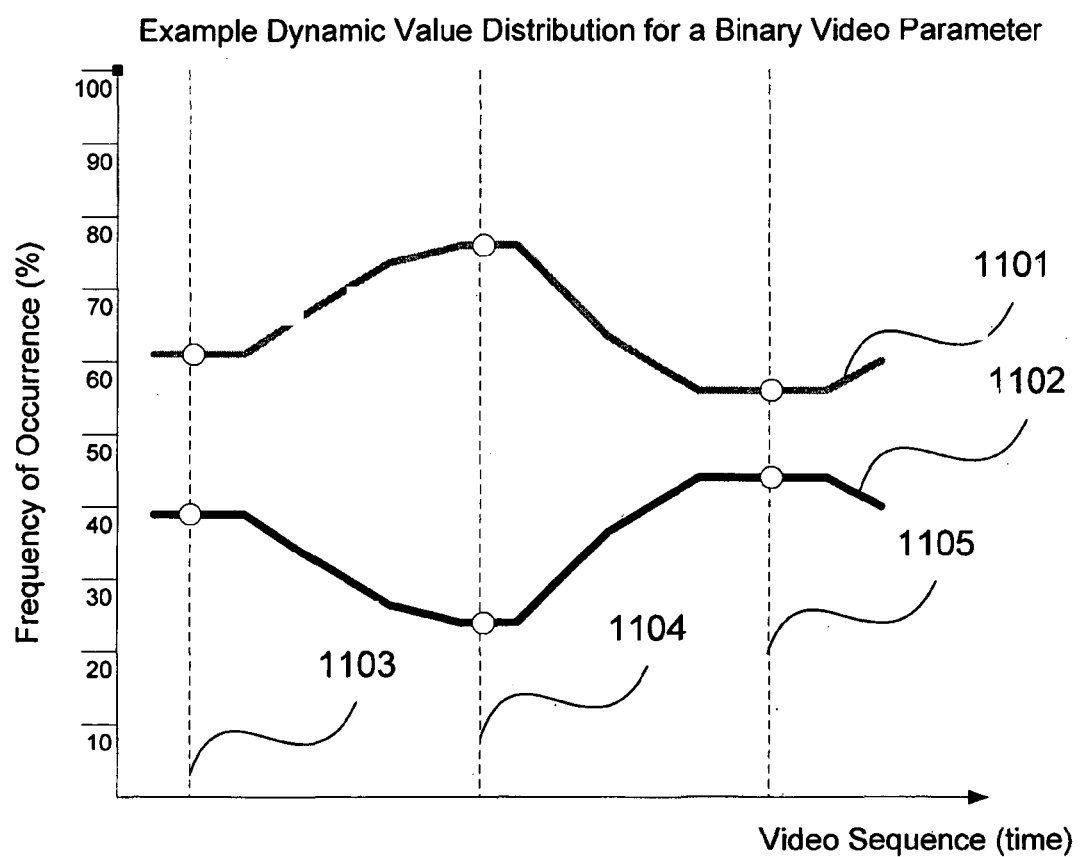
FIG. 11 is a graph illustrating an example value distribution for a binary video parameter.

FIG. 11 shows the actual occurrence distribution of an exemplary binary flag (vertical axis) during the course of the encoding of a set of video data (time, horizontal axis), for a third implementation according to the present disclosure.

The actual distribution frequency as a percentage for the flag value 1 is shown by the plot 1101, and the actual distribution frequency as a percentage for the flag value 0 is shown by the plot 1102.

At a time position 1103, the distribution ratio for the flag value 0 to the flag value 1 is, from the actual values of 38:62, approximately 3:5. The mapping shown in FIG. 10 provides the ideal video parameter mapping ratio (3:5), to minimise the manipulation cost for this video parameter distribution.

As the video sequence the subject of FIG. 11 is encoded at the encoder 100, according to the third implementation the encoder 100 monitors the actual video parameter distribution ratio. Similarly, as the video bitstream is decoded at the decoder 200, the decoder monitors 200 the actual video parameter distribution ratio. Once a threshold for the video parameter distribution ratio has been reached, both the encoder 100 and decoder 200 update the mapping and associated modulo base. All subsequent video parameters are encoded and decoded using this new mapping.

At the time position 1104, the threshold has been reached and both the encoder 100 and the decoder 200 develop a new mapping to be used to embed subsequent video parameter values. At the time position 1104, the distribution ratio for the flag value 0 to the flag value 1 is, from the actual values 25:75, approximately 1:3. A mapping with a modulo base of 4 and a video parameter mapping ratio of 1:3, such as the mapping shown in FIG. 7, would therefore be optimal to embed video parameters at this video parameter distribution ratio.

At the time position 1105, the threshold has been reached again and both the encoder 100 and the decoder 200 develop a new mapping to be used to embed subsequent video parameter values. At the time position 1105, the distribution ratio for the flag value 0 to the flag value 1 is, from actual values 45:55, approximately 9:11. A mapping with a modulo base of 20 would be required to create an optimal mapping for this distribution ratio. As a modulo base of 20 would result in a complex implementation and a large manipulation distance, such a video parameter distribution ratio can be approximated by 1:1, and a mapping with a modulo base of 2 may therefore be used by the encoder 100 and decoder 200.

Manipulating within RDO

In a fourth implementation, a video parameter is embedded in a portion of video data that contains syntax elements describing motion vectors. Values for the video data elements are selected such that when they are aggregated by the modulo dividend function, they produce the desired modulo result value to indicate the video parameter value. In this fourth implementation, the encoder 100 selects the desired values for the video data elements during the rate distortion optimisation (RDO) function.

The RDO is a method of optimising the video quality and the video compression efficiency during video encoding. The values for the video data elements describing the video sequence, such as motion vectors, are selected to produce an optimum balance between decoded video quality and video compressing efficiency.

In the fourth implementation, the encoder 100 performs the RDO as a multi-pass operation, trialling a number of different video data value combinations and assessing the rate/distortion balance that those video data elements provide, as well as their suitability for embedding the video parameter.

The video data value combination which naturally produces the desired modulo result and has the best rate/distortion balance is selected as the chosen video data value combination to be encoded in the bitstream.

Figure 12:
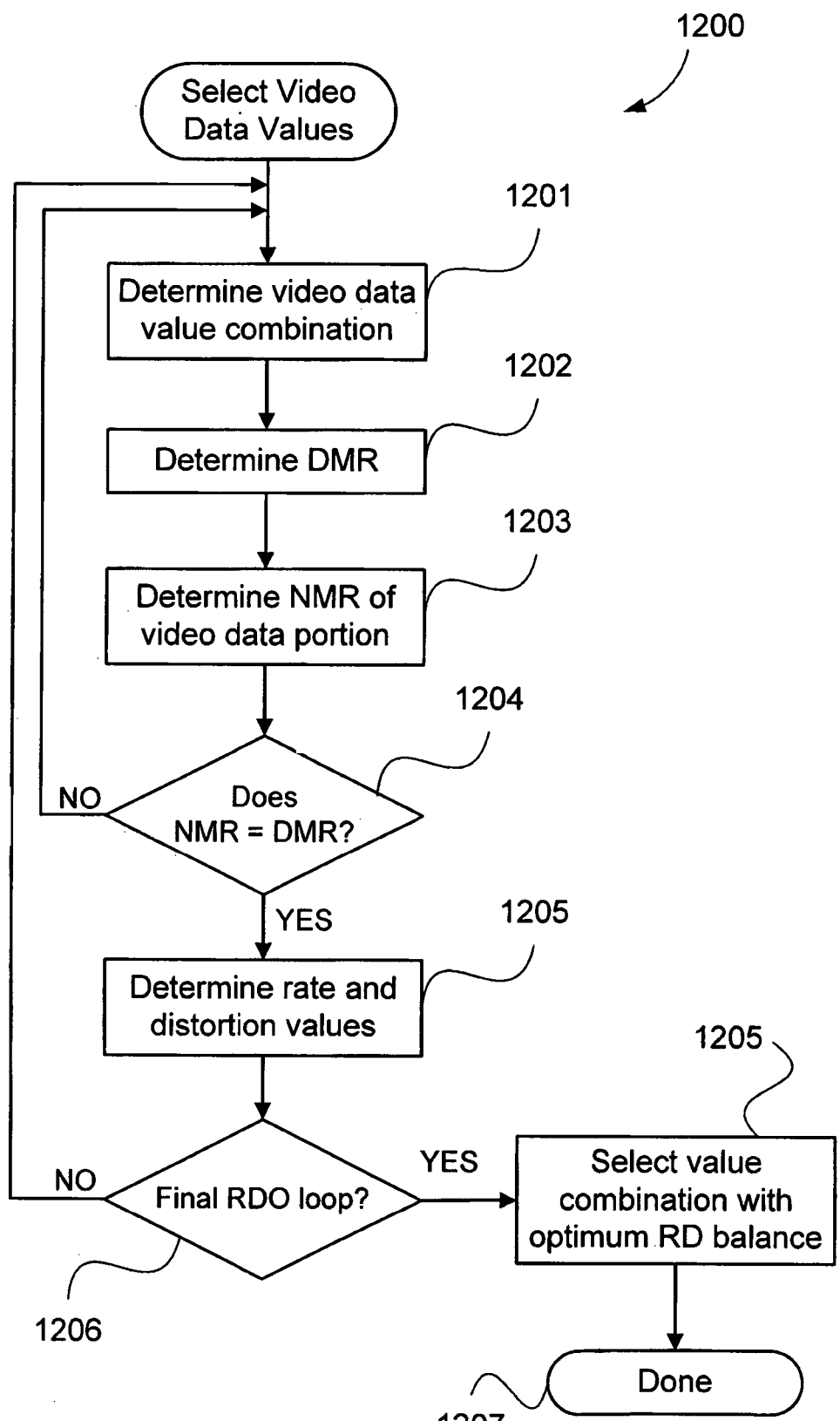
FIG. 12 is a schematic flowchart illustrating a method of selecting the values for the video data elements such that they are suitable for embedding the video parameter.

FIG. 12 shows a flowchart of a method 1200 as performed by the video encoder 100 operating according to the fourth implementation. In step 1201, the encoder 100 selects a value combination, for the superset of video data elements, that accurately describes the video sequence to be encoded.

In this fourth implementation, the video data superset includes the video parameter to be embedded in the video data portion. In alternative implementations, the value of the video parameter may be determined by the encoder 100 prior to the initiation of the process described in FIG. 12.

In step 1202, the encoder 100 determines the desired modulo result, or list of desired modulo results where a plurality exists, for the video parameter to be embedded, by consulting a predetermined mapping (e.g. that of FIG. 10), which for example may be stored in the memory 1306. In step 1203, the encoder 100 determines the natural modulo result of the video data portion by applying the modulo dividend function and the modulo operator.

In step 1204, the encoder 100 determines whether the natural modulo result is equal to the desired modulo result. If the natural modulo result is not equal to the desired modulo result, the encoder 100 rejects the chosen value combination for the video data superset and returns to step 1201 to determine an alternative value combination.

If the natural modulo result does equal the desired modulo result, the encoder 100 proceeds to step 1205 where the encoder 100 determines the rate and distortion values for the chosen value combination for the video data superset. The encoder 100 maintains records in the memory 1306 of the value combination and the rate/distortion value.

The encoder 100 then proceeds to step 1206 to determine whether it has completed the required number of (RDO) calculations, being those of step 1205. The required number is predetermined prior to the process 1200 described in FIG. 12.

If the encoder 100 has not yet completed the required number of RDO calculations, control returns to step 1201, for the encoder 100 to perform another RDO calculation. When the encoder 100 has completed the required number of RDO calculations, processing proceeds to step 1207.

In step 1207, the encoder 100 selects, from the set of results from the required number of RDO calculations, the video data value combination that produces the optimal value combination for the rate and distortion for the video sequence.

Following the process described in FIG. 12, the encoder 100 completes the entropy encoding of the selected video data value combination.

INDUSTRIAL APPLICABILITY

The arrangements described are applicable to the computer and data processing industries and particularly for the accurate and efficient encoding and decoding of video data.

The foregoing describes only some embodiments of the present invention, and modifications and/or changes can be made thereto without departing from the scope and spirit of the invention, the embodiments being illustrative and not restrictive.

The invention claimed is:

1. A method of selecting a value for a video parameter based on a portion of video data encoded in a video bitstream, the method comprising:
   receiving the portion of encoded video data from the video bitstream;
   determining an aggregate value based on residual coefficients in the received portion of the video data;
   determining a remainder by dividing the aggregate value with a predetermined value; and
   selecting a value for the video parameter from a set of predefined values according to a mapping from the determined remainder, wherein the mapping has at least a plurality of values for a remainder corresponding to a single value for the video parameter.

2. A method according to claim 1, wherein the video parameter relates to the video data in which the video parameter is encoded.

3. A method according to claim 1, wherein the mapping is configured to reduce at least one of a manipulation frequency and a manipulation cost associated with the selecting.

4. A method according to claim 1, wherein the number of remainder values in the plurality of values for a remainder, that are mapped to a single value for the video parameter, is selected to reflect a frequency of occurrence of the value for the video parameter.

5. A method according to claim 4, wherein the frequency of occurrence is calculated based on content of the video bitstream received before the portion of video data.

6. A method according to claim 4, wherein the frequency of occurrence is a predetermined characteristic of the video parameter.

7. A method according to claim 3, further comprising:
   determining the mapping by evaluating a minimal mapping distance between the plurality of values for a remainder and selecting one of the plurality having the largest minimum mapping distance to determine the selected value for the video parameter.

8. A method according to claim 7, wherein the mapping is determined such that alternate video parameter values are interleaved throughout the range of remainder values.

9. A method according to claim 3, wherein the mapping is a first mapping, the method further comprising:
   monitoring a frequency of occurrence of the video parameter values,
   detecting a frequency of occurrence matching a predetermined threshold,
   creating a second mapping configured according to a second frequency of occurrence, and
   changing the selecting from the first mapping to the second mapping.

10. A method according to claim 9, wherein the creating of the second mapping comprises altering the mapping from the remainder values to the video parameter values.

11. A method according to claim 10, wherein values that form the plurality of values for a remainder are selected to reduce a manipulation cost of the selecting.

12. A method according to claim 9, wherein the creating of the second mapping comprises altering the predetermined value and consequentially changing the mapping.

13. A method according to claim 9, further comprising:
selecting a mapping path from the determined remainder to a value for the video parameter according to a frequency of occurrence of the value for the video parameter.

14. A method according to claim 3, wherein the video parameter has a limited number of values selected from one of binary and ternary values.

15. A method of decoding a bitstream of encoded video data, said method comprising:
first decoding the bitstream to form video data and a video parameter based on a portion of the video data;
selecting a value for the video parameter according to the method of claim 1; and
second decoding the video data using the selected value of the video parameter to provide decoded video frame data.

16. A method according to claim 15, wherein the second decoding comprises decoding the portion of the video data using a selected value of the video parameter corresponding to that with which the portion was encoded.

17. A method of selecting a most probable prediction mode (MPM) to be applied to a prediction unit in an encoded video stream based on residual coefficients encoded in a video bitstream, the method comprising the steps of:
receiving a portion of the residual coefficients from the video bitstream;
deriving a value from the portion of the residual coefficients;
determining a remainder from the portion of the residual coefficients according to a modulo function applied to the derived value;
selecting the most probable prediction mode from a set of predefined most probable prediction modes according to a mapping from the determined remainder, wherein the mapping has at least a plurality of values for a remainder corresponding to a single value for the most probable prediction mode, said correspondence being determined from a frequency of occurrence of said most probable prediction mode.

18. A video decoder comprising:
means for receiving a portion of encoded video data associated with video bitstream;
means for determining an aggregate value based on residual coefficients in the received portion of the video data;
means for determining a remainder by dividing the aggregate value with a predetermined value;
means for selecting a value for the video parameter from a set of predefined values according to a mapping from the determined remainder, wherein the mapping has at least a plurality of values for a remainder corresponding to a single value for the video parameter.

19. A decoder according to claim 18 wherein the mapping is predetermined for the video parameter.

20. A decoder according to claim 19 further comprising:
means for determining the mapping from a set of remainders and a possible n values of the video parameter according to a probability distribution of the n possible values.

21. A decoder according to claim 18, wherein the set of predefined values comprises the values 0, 1, 2 and 3 and the video parameter has values selectable from the set comprising 0 and 1.

22. A non-transitory computerized apparatus adapted to select a value for a video parameter based on a portion of video data encoded in a video bitstream, the apparatus comprising:
means for receiving the portion of encoded video data from the video bitstream;
means for determining an aggregate value based on residual coefficients in the received portion of the video data;
means for determining a remainder by dividing the aggregate value with a predetermined value; and
means for selecting a value for the video parameter from a set of predefined values according to a mapping from the determined remainder, wherein the mapping has at least a plurality of values for a remainder corresponding to a single value for the video parameter.

23. A non-transitory computer readable storage medium having a computer program recorded thereon, the program being executable by computerized apparatus to select a value for a video parameter based on a portion of video data encoded in a video bitstream, the program comprising:
code for receiving the portion of encoded video data from the video bitstream;
code for determining an aggregate value based on residual coefficients in the received portion of the video data;
code for determining a remainder by dividing the aggregate value with a predetermined value; and
code for selecting a value for the video parameter from a set of predefined values according to a mapping from the determined remainder, wherein the mapping has at least a plurality of values for a remainder corresponding to a single value for the video parameter.

* * * * *